Patented July 23, 1929.

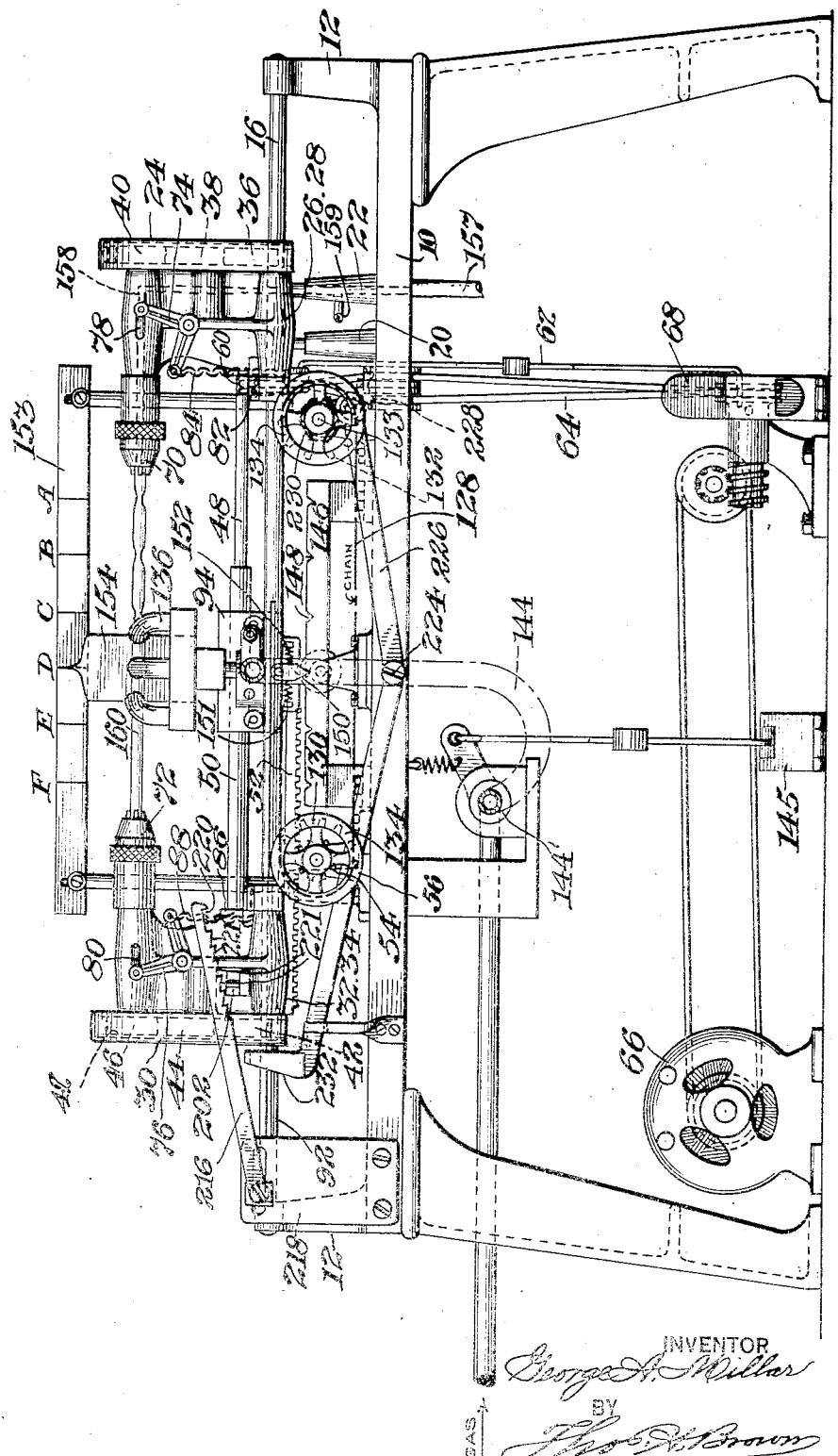

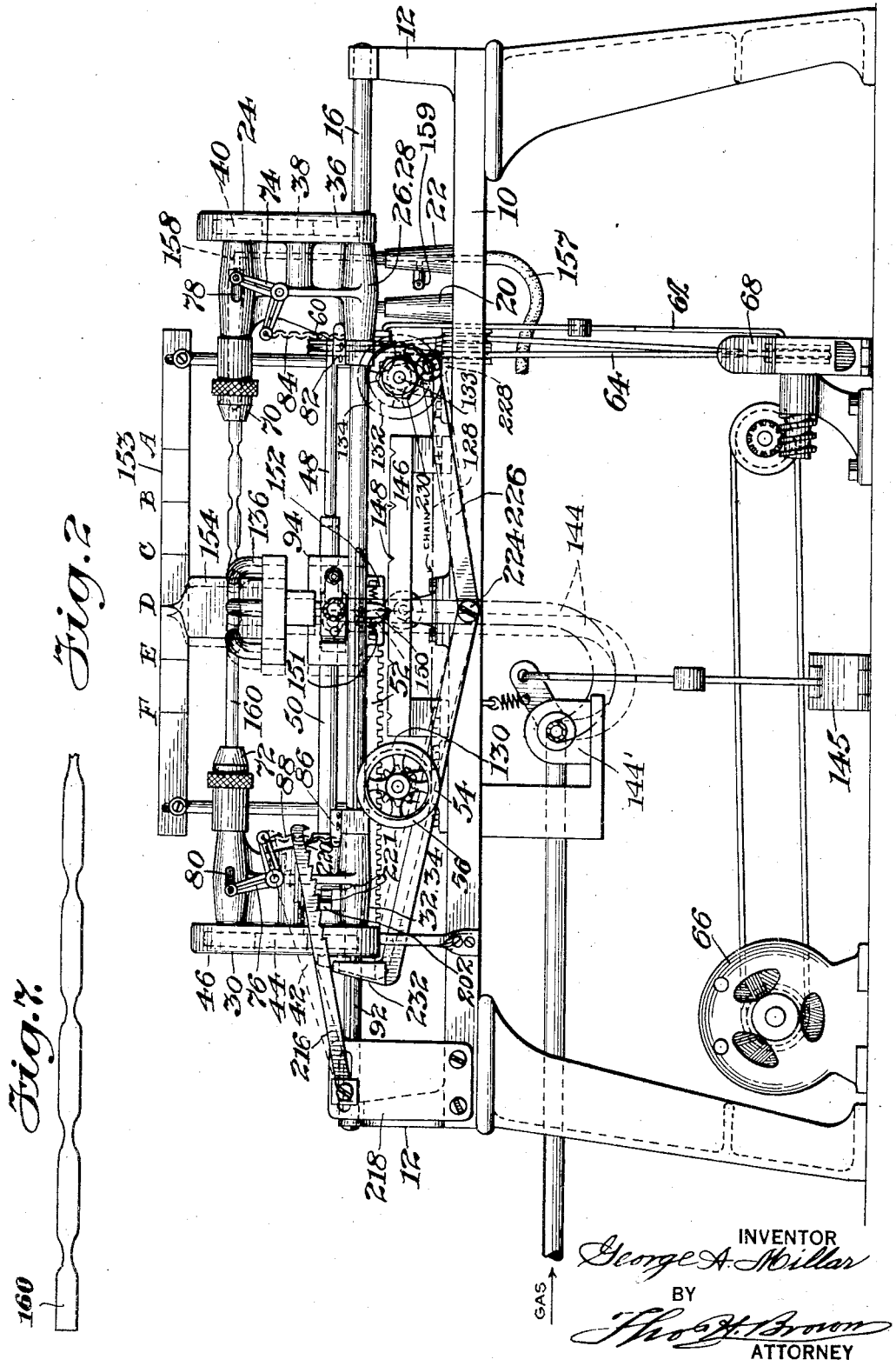

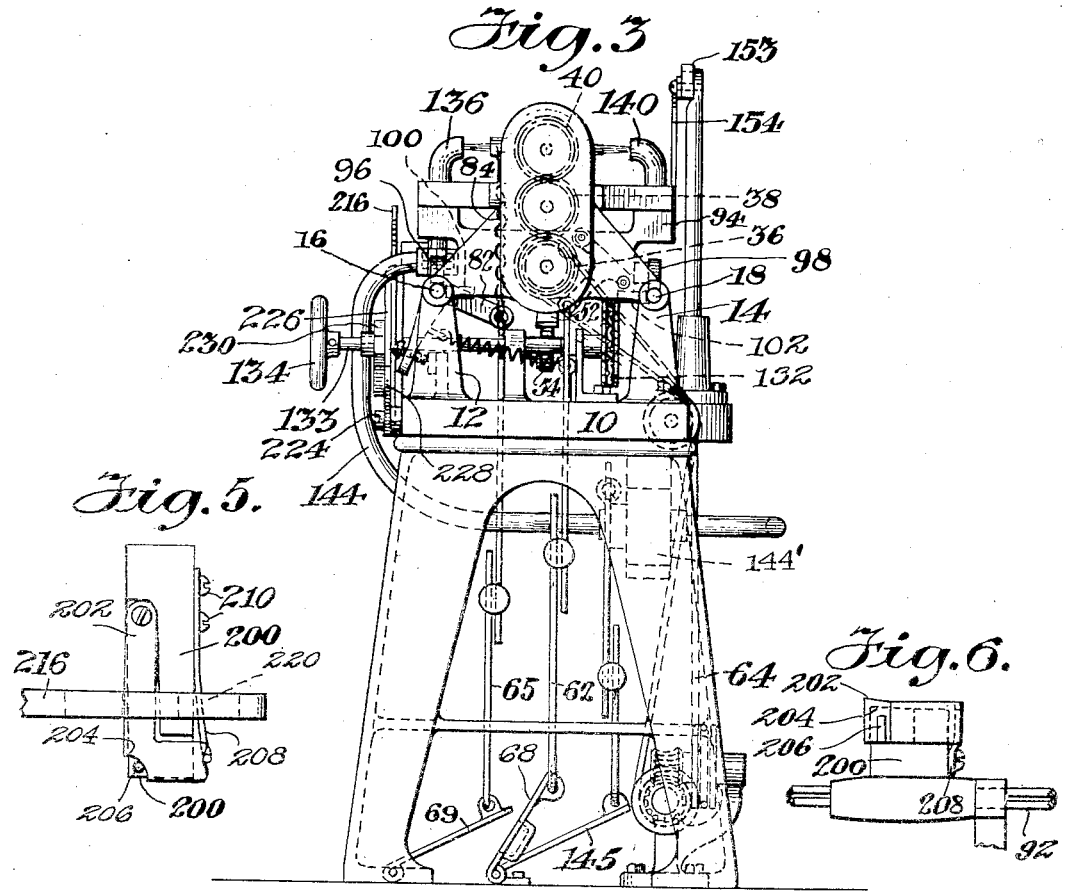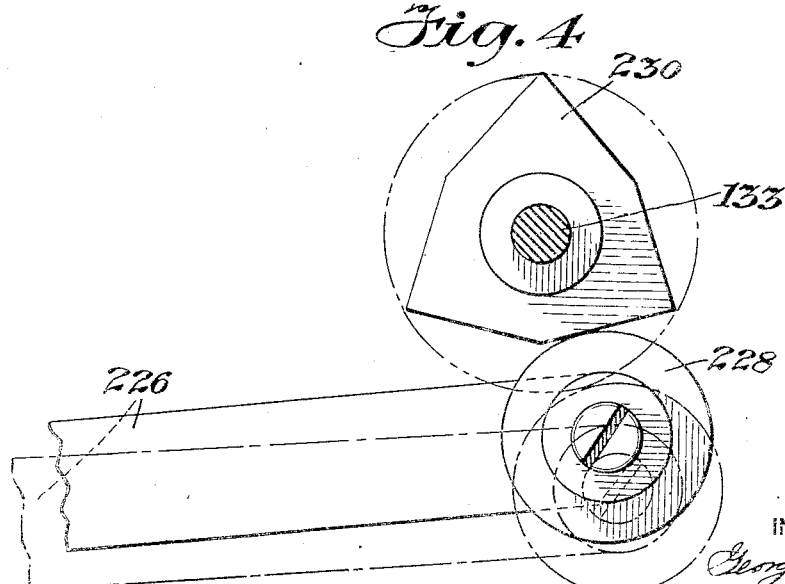

1,721,570

UNITED STATES PATENT OFFICE.

GEORGE A. MILLAR, OF RIDGEFIELD PARK, NEW JERSEY, ASSIGNOR TO COOPER HEWITT ELECTRIC COMPANY, OF HOBOKEN, NEW JERSEY, A CORPORATION OF NEW JERSEY.

GLASS-WORKING MACHINERY.

Application filed February 26, 1927. Serial No. 171,291.

The present invention relates to machinery for working hollow parts for shaping them into desired forms.

Various objects and advantages of the invention will be obvious from the following particular description of one form of apparatus embodying the invention or from an inspection of the accompanying drawings; and the invention also consists in certain new and useful features of construction and combinations of parts hereinafter set forth and claimed.

In the accompanying drawings there is shown for purposes of illustration one form of apparatus embodying the invention, in which Figs. 1 and 2 are front elevation views of a machine embodying the invention, showing the parts in different relations during the operation thereof, Fig. 3 is a side elevation view thereof, Fig. 4 is a diagrammatic view showing details of the machine, Figs. 5 and 6 are respectively plan and front elevation views of other details, and Fig. 7 is a longitudinal view illustrating a glass tube having annular constrictions formed therein by the machine herein illustrated and described.

In the drawings the bed plate 10 supports at each end a pair of standards 12 and 14. Said standards 12 support between them the shaft 16 which is movable rotationally therein. Said standards 14, 14 support between them the fixed shaft 18. Near one end of said plate 10 the posts 20, 20 and 22, support the block 24 having the longitudinal bosses 26 and 28 through which said shafts 16 and 18 extend respectively. At the opposite end of the machine said shafts 16 and 18 carry the block 30 which has a pair of bosses 32 and 34 through which said shafts 16 and 18 respectively extend and by means of which said block 30 is slidable longitudinally on said shafts 16 and 18. On a line extending vertically between said shafts 16 and 18 said block 24 carries a train of gears 36, 38 and 40. In similar arrangement said block 30 supports a vertical train of gears 42, 44 and 46. Said gears 36 and 42 are connected by a telescoping shaft comprising the shaft 48 connected to said gear 36 and a hollow shaft 50 connected to said gear 42, said shafts 48 and 50 being splined together to provide proper driving connection therebetween and to permit a longitudinal movement of one with respect to the other. A longitudinal rack 52 connected to said block 30 and a pinion 54 mounted to said plate 10 and having a hand wheel 56 serve for moving said block 30 longitudinally on said shafts 16 and 18. The said shaft 48 carries a driving pulley 60 and clutch member, the details of which are not shown, said pulley 60 being driven by the belt 64 which is connected to the driving motor 66. Said pulley 60 is engaged and disengaged from said shaft 48 by means of the foot treadle 68 which is connected to said clutch member not shown. Said gears 40 and 46 carry respectively the chucks 70 and 72 which are axially aligned and extend toward each other. Said chucks 70 and 72 are of the spring expansible type in which a set of jaws is acted upon by a spring to tend to move them apart and a sleeve is slidable over tapering surfaces on said jaws to draw them together into the clamping position. Each of said chucks 70 and 72 has a bell crank 74 and 76, respectively, which are pivotally mounted to said blocks 24 and 30 respectively and are connected to the sleeve of the respective chuck for moving it into the clamp closing position, slidable and pivoted connection therebetween being made respectively through a slot 78 and 80 respectively, in said blocks 24 and 30. Said shaft 16 carries a crank lever 82 which connects through the chain 84 to said bell crank 74 and at said block 30 said shaft 16 carries the crank lever 86 which connects through the chain 88 to said bell crank 76. Said foot pedal 68 is connected through rod 62 and lever 82 to said shaft 16 and serves to actuate it to operate said chucks 70 and 72, said lever 82 being fixed to said shaft 16 and said lever 86 having a sliding connection therewith through a spline on said lever 86 and the longitudinal keyway 92 formed in said shaft 16. Fig. 3 shows an alternative arrangement whereby a separate pedal 69 operating through rod 65 and said lever 82 serves to actuate the chucks 70 and 72. In this case pedal 68 actuates only the clutch (not shown) whereby pulley 60 is engaged with and disengaged from shaft 48.

Below said chucks 70 and 72 a carriage 94 rides on said shafts 16 and 18 through rollers 96 and 98, and guide rollers 100 and 102 guide said carriage 94 against lateral movement on said shaft 16 and 18. Longitudinal movement of said carriage 94 along said shafts 16 and 18 is imparted by means of the sprocket chain 128 which passes over a sprocket 130 which idles on the shaft of said sprocket 54 at one end and over the sprocket 132 mounted on shaft 133 near said block 24, a hand wheel 134 being provided for said sprocket 132 for the actuation of said chain 128 and thereby of said carriage 94 in either direction. One on either side of said carriage 94 and directed inwardly toward the line between said chucks 70 and 72 are mounted the sets of gas jets 136 and 140 connection thereto being made through the flexible hose 144 through a valve 144' from a suitable source of gas not shown, a foot treadle 145 being provided for the operation of said valve 144'. A semi-automatic stop or position indicating arrangement for said carriage 94 comprises a longitudinal bar 146 mounted below said carriage 94 and having therein a number of V notches 148 facing upwardly. Said carriage 94 pivotally supports a dog 150 which is held in engagement with said bar 146 and with the V notches thereof by means of the oppositely acting holding springs 151 and 152, said dog 150 having inclined surfaces which upon engagement with the surfaces of said V notches 148 will cause the movement of said dog 150 against tension of one of said springs 151 or 152 to permit the longitudinal movement of said carriage 94 longitudinally in either direction. Another position indicator comprises the bar 153 mounted to the plate 10 and extending longitudinally at the rear of said carriage 94, and an indicator 154 on said carriage 94 which cooperates with lines or moves over said bar 153 to indicate the longitudinal position of said carriage on said plate 10.

Said chuck 72 has a stopper member (not shown) therein for closing up the open end of a glass tube or other hollow glassware held thereby and said chuck 70 has a stopper (not shown) therein which has a central opening therein for supplying air pressure to a piece of hollow glassware held by said chuck 70, connection from a suitable source not shown being made through the tube 157 and the passage 158 formed through said post 22, block 24 and the mandrel or shaft of said gear 40 and chuck 70. A by-pass 159 connecting with said channel 158 is provided near hand wheel 134 to regulate the pressure at which air is supplied to a tube held by said chuck 70.

Means for moving said chuck 72 through said hand wheel 54 for stretching out a piece of glass through a given distance which has been softened to produce a constriction therein and for automatically measuring the distance of movement and for setting the measuring means ready to measure the next subsequent elongation are hereinafter described.

On said boss 32 is mounted the forwardly extending bar 200 which is cut away at the left side and across the front to form an L shaped depression thereat on which is pivoted at the rear of said depression the L shaped block 202 for lateral movement thereon. A vertical notch 204 in the front corner of said member 202 accommodates a pin 206 fixed in said member 200 which serves as a lateral stop in one direction to limit the lateral movement of said member 202 on its pivot. The longitudinal raised portion of said block 200 which extends alongside of said L shaped depression serves to limit the movement of said member 202 in the opposite direction. A spring 208 fixed to said block 200 by the screws 210 tends to hold said block 202 against said pin 206. The upper surface of said block 202 slants downwardly from its outer longitudinal edge to provide a locking edge thereat for a co-operating arm 216 which is pivoted at one end to a support member 218 mounted at the end of the machine nearest said block 30. From its pivotal connection with said support 218 said arm 216 extends over said block 202 and has formed on the under surface thereof at its free end the longitudinal notch 220, the side thereof which is nearest the pivot end being under cut. From said under cut surface there extends toward the pivot end of bar 216 a series of notches 221, 221 which have two sides, the one nearest the pivot end of the bar being under cut similarly to the under cut side of notch 220 and the other side tapering in from the lower edge of the under cut surface of the adjacent notch up to the top of the under cut surface of its notch. Pivoted on frame 10 by the bolt 224 at a point nearer one end than the other is the longitudinal lever 226. At the short end said lever 226 carries the roller 228 which is positioned directly beneath said shaft 133 and in operative relation with a cam 230 which is carried by said shaft 133 and fixed thereto. Said cam 230 has raised portions for engaging said roller 228 which are at such angular distances apart that said roller 228 will be depressed by the rotation of said hand wheel 134 once for every time that said carriage 94 passes through a distance equal to the distance between adjacent ones of said notches 148. At the end opposite said roller 228 said lever 226 carries an upwardly extending arm 232 which when said roller end is depressed by said cam 230 is raised against said lever 216 to cause it to move upwardly about its pivot and to disengage said notches 220 and 221 from said member 202. If said block 30 has been moved toward the pivot end of arm 216 to bring said member 202 tightly against the engaging edge of one of the slots 220 or 221 said member 202 will be moved against the longitudinal limiting portion of said part 200 and against the pressure of said spring 208, and then when said lever 216 is rotated upwardly to bring the engaging notch thereof from engagement with said stop 202 said spring 208 will move said bar 202 against said stop pin 206. Upon continuation of the rotation of hand wheel 134 to bring a lower portion of said cam 230 into engagement with said roller 228 said bar 232 will be depressed by the weight of that end of lever 226 and said lever 216 will move downwardly into engagement with said bar 202 at a point on one of the notches thereof close to the under cut surface of the next preceeding notch whereby movement of said block 30 and chuck 72 through said hand wheel 56 can be made which is measured and which is equal to the distance between corresponding parts of any two consecutive ones of said notches 220 and 221. This arrangement for predetermining the distance of movement of said block 30 and chuck 72 is made to provide for the elongation of the glass tube 160 at a softened portion thereof for a given distance to produce in the tube at this softened portion a constriction of predetermined length and diameter.

In the use and operation of the machine herein described and illustrated for the producing of constrictions of a given length and at measured distances apart in a glass tube the operation is as follows. Said carriage 94 through said hand wheel 134 is brought to a position in which indicator 154 will register with the mark A on said bar 153 and said block 30 through said hand wheel 56 is moved to bring said member 200 into said notch 220 and against the right hand vertical side thereof. A piece of glass tubing 160 is mounted on said chucks 70 and 72 and set in rotation thereby and the flames from said jets 136 and 140 are raised through the operation of said valve 144' by said pedal 145 to melt the glass of said tube 160 at this point. When the glass has been sufficiently softened air pressure in said tube 160 which is supplied through said tube 157 is regulated at the by-pass 159 and said block 30 and chuck 72 are moved in a direction away from said chuck 70 by means of said hand wheel 56 to elongate the glass tube at the molten part, the movement and the air pressure in the tube being properly timed and controlled to produce a constriction of desired diameter and of uniform shape. The length of the constriction being predetermined by the length of said notch 220, the fires 136 and 140 through the rotation of said hand wheel 134 are now moved to the position B as shown by indicator 154 on member 153, and by the rotation of said hand wheel 134 during this measured distance said cam 230 is rotated from a position in which the lower surface thereof is in engagement with said roller 228 through a position in which a higher surface thereof passes through engagement with roller 228 and then back again to a lower surface, whereby through the movement of said lever 226 said lever 216 is moved to bring the under cut surface of notch 220 from engagement with said member 202 whereupon said spring 208 will move said member 202 against said stop 206 following which there is permitted by the action of said cam 230 the lowering of said lever 216 into a position in which the first notch 221 next to notch 220 engages said member 202 at a point near the under cut surface of said notch 220. In this manner at the beginning of the melting of the glass at a second point the means for measuring the distance of movement of said chuck 72 and comprising said members 200 and 202 and lever 216 are brought into operative relation for such measuring of the movement of chuck 70. By the time the glass at the second point has been fused sufficiently to be worked the glass at the first constriction has cooled and set sufficiently for the pulling apart of the ends of the glass tube to elongate it and constrict it at the second fused place. This of course, is done as above described by the rotation of hand wheel 56 to bring said member 202 against the under cut surface of said first notch 221. The steps described are then repeated to produce constrictions in tube 160 in such number as the length thereof may permit.

In the operation of the machine said pedal 68 may, as in Figs. 1 and 2 serve to simultaneously operate the clutch member on said driving pulley 60 and also the closing of said chucks 70 and 72 whereby the glass tube immediately upon being clamped in said chucks 70 and 72 is set into rotation.

While I have shown and described and have pointed out in the annexed claims certain novel features of the invention, it will be understood that various omissions, substitutions and changes in the forms and details of the device illustrated and in its use and operation may be made by those skilled in the art without departing from the spirit of the invention.

I claim:

1. In glass working machinery, in combination, a pair of work holders axially aligned and extending toward each other one of them being movable toward and from the other, means for synchronously rotating said work holders, a set of glass melting fires projecting toward a line between said work holders, means for moving said fires longitudinally between said work holders, means for moving said movable holder away from the other said holder, and means operable upon movement of said fires away from the said other work holder for measuring and predetermining the distance through which said movable work holder can be moved by its said moving means.

2. In glass working machinery, in combination, means for holding a piece of hollow glassware at one part thereof, means for holding such a piece at another part thereof, one of said means being movable relatively one toward and away from the other, means for synchronously rotating said holding means, heating means for glassware held by said holding means, and means for moving one of said holders away from the other of said holders, means for moving said fires, and means for automatically measuring the distance said movable holder is moved away from the other said holder.

3. In glass working machinery, in combination, means for holding a piece of hollow glassware at one part thereof, means for holding such a piece at another part thereof, one of said means being movable relatively one toward and away from the other, means for synchronously rotating said holding means, heating means for glassware held by said holding means, and means for moving one of said holders away from the other of said holders, means for moving said fires, and means for automatically measuring the distance said movable holder is moved away from the other said holder comprising a latch.

4. In glass working machinery, in combination, means for holding a piece of hollow glassware at one part thereof, means for holding such a piece at another part thereof, one of said means being movable relatively one toward and away from the other, means for synchronously rotating said holding means, heating means for glassware held by said holding means, and means for moving one of said holders away from the other of said holders, means for moving said fires, and means for automatically measuring the distance said movable holder is moved away from the other said holder comprising a latch and means operable by said fire moving means for tripping said latch.

5. In glass working machinery, in combination, means for holding a piece of hollow glassware at one part thereof, means for holding such a piece at another part thereof, one of said means being movable relatively one toward and away from the other, means for synchronously rotating said holding means, heating means for glassware held by said holding means, and means for moving one of said holders away from the other of said holders, means for moving said fires, and means for automatically measuring the distance said movable holder is moved away from the other said holder comprising a latch and means operable by said fire moving means for tripping said latch, said latch having parts which automatically set it for another measurement.

Signed at Hoboken in the county of Hudson and State of New Jersey this 24th day of February, A. D. 1927.

GEORGE A. MILLAR.